United States Patent
Holzapfel et al.

[19]

[11] Patent Number: 6,076,849
[45] Date of Patent: Jun. 20, 2000

[54] MOTOR VEHICLE DASHBOARD ASSEMBLY

[75] Inventors: Bernhard Holzapfel, Remshalden; Martin Kruse, Sindelfingen; Michael Sinner, Rottenburg; Rolf Dembowski, Erdingen; Rainer Zipfel, Breisach, all of Germany

[73] Assignee: DaimlerChrysler AG, Germany

[21] Appl. No.: 08/985,289

[22] Filed: Dec. 4, 1997

[30] Foreign Application Priority Data

Dec. 4, 1996 [DE] Germany ............... 196 50 195

[51] Int. Cl.⁷ ................................................. B60R 21/16
[52] U.S. Cl. ................................. 280/728.2; 280/728.3; 280/732
[58] Field of Search ......................... 280/728.2, 728.3, 280/732

[56] References Cited

U.S. PATENT DOCUMENTS

| | | | |
|---|---|---|---|
| 5,066,037 | 11/1991 | Castrigno et al. | 280/732 |
| 5,520,410 | 5/1996 | Sun | 280/728.3 |
| 5,527,065 | 6/1996 | Saberan et al. | 280/728.3 |
| 5,556,126 | 9/1996 | Lee | 280/728.3 |
| 5,584,502 | 12/1996 | Phillion et al. | |

FOREIGN PATENT DOCUMENTS

| | | |
|---|---|---|
| 0596312A2 | 10/1993 | European Pat. Off. . |
| WO 94/10010 | 5/1994 | European Pat. Off. . |
| 0629528A1 | 6/1994 | European Pat. Off. . |
| 0714817A2 | 6/1996 | European Pat. Off. . |
| 0747268A2 | 12/1996 | European Pat. Off. . |
| 4306449A1 | 9/1993 | Germany . |
| 4229379C2 | 3/1994 | Germany . |
| 4306149A1 | 9/1994 | Germany . |
| 2599616 | 11/1995 | Japan . |

*Primary Examiner*—Kenneth R. Rice
*Attorney, Agent, or Firm*—Evenson, McKeown Edwards & Lanahan, P.L.L.C.

[57] ABSTRACT

A panel is inserted into a cutout in the visible boundary wall of a fascia, in particular in a motor-vehicle dashboard, which panel contains an airbag cover which is delimited with respect to the panel and is pressed open in the event of a crash by means of an inflating airbag sack. The panel is secured releasably at least in some regions along the contour of the airbag cover and, in the process, outside the airbag cover, in a manner which is invisible from the vehicle interior, by latching projections being provided which are molded integrally onto the rear side of said panel and engage into associated sockets which are not supported on the visible boundary wall of the fascia.

14 Claims, 1 Drawing Sheet

MOTOR VEHICLE DASHBOARD ASSEMBLY

BACKGROUND AND SUMMARY OF THE INVENTION

This application claims the priority of German application 196 50 195.4 filed in Germany on Dec. 4, 1996, the disclosure of which is expressly incorporated by reference herein.

The invention relates to a panel assembly in a fascia, in particular in a motor-vehicle dashboard with an airbag disposed underneath the fascia.

German Patent Document DE 43 06 149 A1 discloses a fascia, into a cutout in the boundary wall of which, which is visible in the vehicle interior, there is inserted a panel which contains an airbag cover, which is connected to the panel at predetermined breaking lines as well as by metal hinges. The panel is connected releasably to the visible boundary wall of the fascia by a screw connection, in the vicinity of the predetermined breaking lines or the hinge pin, which causes the panel to be held on the boundary wall of the fascia as the airbag sack inflates and the airbag cover, at the same time, is pressed open. The problem with this is that the screw connection has to be made from the rear side of the fascia so that the screw connection can be covered over towards the vehicle interior, within view of the occupant, in a visually attractive manner. A screw connection of this type should also not protrude in a clearly visible manner into the vehicle interior for reasons of safety in respect of being handled incorrectly or of an injury due to impact. Access when installing and checking the airbag module is not made easier by this rigidly fitted panel. In addition, as the airbag sack is inflating in the event of a crash the entire load of the airbag cover is introduced via the screw connection into the boundary wall of the fascia, which therefore has to be of reinforced design for this high load.

It is furthermore known from German Patent Document No. DE 43 06 449 A1 to screw a panel visibly onto the visible boundary wall of a dashboard, which panel contains an airbag cover which is pressed open in the event of a crash by means of the inflating airbag sack. A panel screw connection in that region of the dashboard which is visible from the vehicle interior is not acceptable either visually or because of the risk of injury from the protruding screws.

German Patent Document DE 42 29 379 C2 describes a covering for the airbag sack in a vehicle, which covering has a panel frame and an airbag cover which opens in the event of a crash and is connected to the panel frame via elastomeric polymer. The panel frame is connected permanently to the visible boundary wall of the dashboard by welding, riveting or bonding. As a result, it is virtually impossible for the panel frame to be replaced after having been damaged in a crash without an expensive repair. It is also only possible to exchange the airbag cover with the dashboard removed.

An object of the invention involves designing a panel, which is of the generic type, is inserted into the visible boundary wall of a fascia and has an integrated airbag cover, such that it can be installed easily, and holding it securely in its position as the airbag sack inflates and the airbag cover opens.

This object is achieved according to preferred embodiments of the invention by providing a panel assembly in a motor-vehicle dashboard fascia, comprising a panel inserted into a cutout in a visible boundary wall of the fascia, an airbag cover which is delimited with respect to the panel and is configured to be pressed open in the event of a crash by means of an inflating airbag sack, and latching projections releasably securing the panel at least in some regions along a contour of the airbag cover and outside the airbag cover in a manner which is invisible from a vehicle interior, wherein the latching projections which are used for the securing are molded integrally onto a rear side of the panel and engage into associated sockets which are not supported on the visible boundary wall of the fascia.

The arrangement of a panel, which can be installed and detached again in a simple manner, in the visible boundary wall of a motor-vehicle fascia has a number of advantages as discussed below.

For the purposes of visual attraction the panel may be constructed from a different material than the boundary wall of the fascia and in another color. Furthermore, it is possible for the panel not to be inserted into the visible boundary wall until the units have been installed in the fascia, thus making the installation of said panel easier. After an airbag sack has inflated during a crash and after the resultant opening movement of the airbag cover integrated into the panel, simple and cost-effective exchange of the panel enables the previous condition to be restored.

The panel, which is arranged centrally in front of a passenger, is secured releasably, in a manner which is invisible from the vehicle interior, so as not to have any unsightly fastenings, but also to minimize any risk of injury being caused by the fastenings. With the latching projections, which, for this purpose, are molded integrally onto the rear side of the panel along the contour of the airbag cover and, in the process, outside the airbag cover, the panel is held securely in that region around the contour of the airbag cover which is acted upon the most strongly as the airbag is inflating, the panel being supported in a socket without that boundary wall of the fascia which is visible and surrounds the panel being subjected to force. The boundary wall of the fascia does not, therefore, have to be reinforced for the panel to have a sufficient support. A panel of this type may be provided in the dashboard over a front-passenger airbag, and equally in a side of a vehicle over a side airbag. In addition, any desired arrangement of the panel in the visible boundary wall of the fascia is possible since the panel can be firmly locked in place. The exit direction of the airbag sack may therefore likewise be selected freely, as a result of which, in the case of a front-seat passenger airbag, a direction approximately parallel with respect to the windshield is also possible, and the airbag sack hence impacts neither against the windshield nor frontally against a passenger.

In an advantageous development, the latching projections can have a hook shape with which they can be inserted into slotted guide links in the socket and can then be displaced approximately in the direction of the panel surface in a manner such that they engage behind it, after which the panel assumes a position in which it is held non-displaceably, by means of a simple, releasable fastening, in a region which is concealed from sight from the vehicle interior. The assuming of this position also enables a check to be made that the panel really is installed correctly in the sockets in an engaging manner. Moreover, this additional, releasable fastening in a dashboard may simultaneously serve for the fastening of the glove compartment.

The panel can cover over an opening in the visible boundary wall of the fascia in such a manner that it corresponds with an airbag cover, which is additionally provided in the visible boundary wall of the fascia, thus producing a relatively large airbag-cover surface or a relatively large opening as the airbag sack is inflating. In this case, it is also possible, by means of the material thickness and the configuration of the airbag-cover hinges or airbag-cover predetermined breaking points, to control the opening movement of the airbag cover in the visible boundary wall of the fascia such that it occurs at a time after the opening movement of the airbag cover in the panel, with the result that it is possible for an inflation direction to be imposed on the airbag sack. In addition, the edge of the airbag cover in the boundary wall of the fascia can be supported on projections on the rear side of the panel, and as a result, pressing-in of the edge from the vehicle interior can be avoided.

In an advantageous manner, the airbag cover is designed such that it coincides with a corner section of the panel and is bounded only on two sides by predetermined breaking lines which tear open successively, starting from the center, in the event of a crash by means of the inflating airbag sack and release the path for said a airbag sack to exit out of the fascia. For this purpose, a panel material made of PC-ABS (polycarbonate-acrylbutadiene) is particularly suitable.

Other objects, advantages and novel features of the present invention will become apparent from the following detailed description of the invention when considered in conjunction with the accompanying drawings.

DETAILED DESCRIPTION OF THE DRAWINGS

Figure 1:
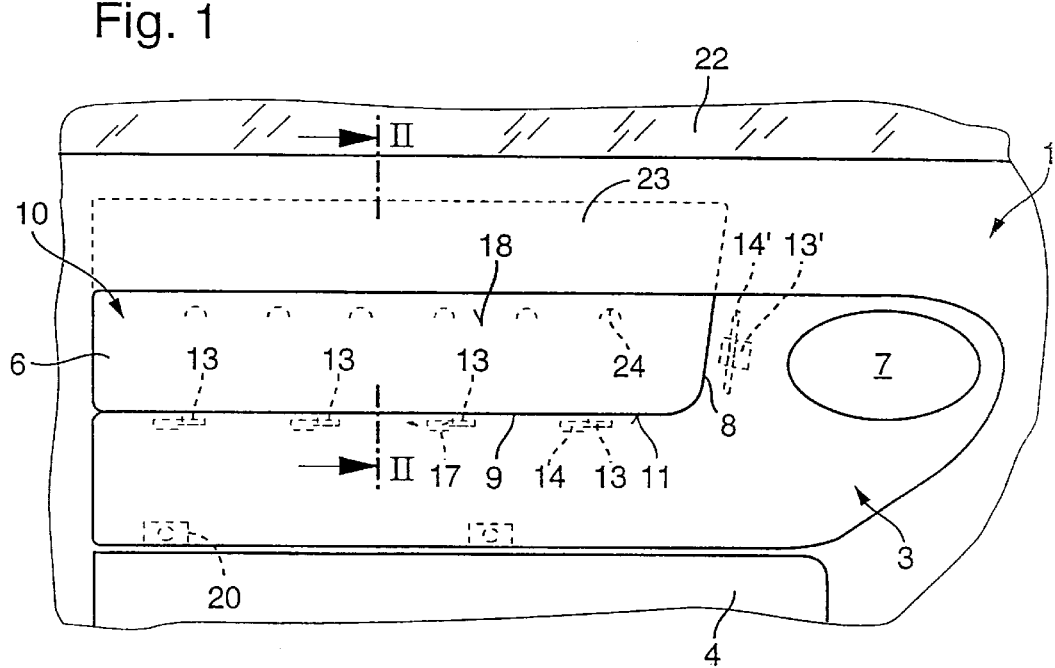
FIG. 1 is a schematic front view of a panel assembly with an airbag cover in a dashboard, constructed according to a preferred embodiment of the invention.

FIG. 1 shows the visible boundary wall of a fascia 1, in this case a dashboard on the front-passenger side in a motor vehicle, as seen by an occupant (not shown) from the vehicle interior 2. The visible boundary wall of the dashboard 1 has a plurality of openings which are covered over in the direction towards the vehicle interior 2 by means of a panel 3 and by means of a glove compartment 4, inter alia.

Figure 2:
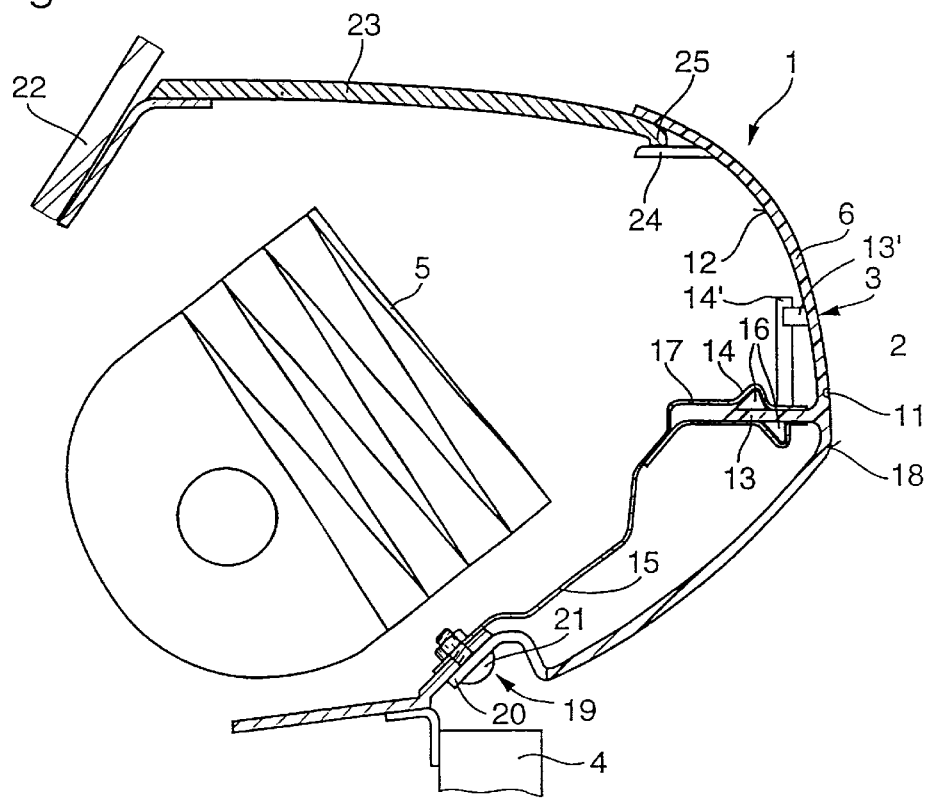
FIG. 2 is a cross-section along the line II—II in FIG. 1.

As FIG. 2 shows more clearly, the panel 3 lies over an airbag system which is arranged behind the dashboard 1 and the airbag sack 5 of which, sketched folded here, shoots out in the event of a crash in the direction of the panel 3, which is why an airbag cover 6, which opens in the process, is integrated into the panel 3. Furthermore, the panel 3 has a fan opening 7.

The airbag cover 6 in the panel 3 is delimited from the panel 3 by means of preformed predetermined breaking lines 8 and 9 which tear open in the crash, due to the force effect of the airbag sack 5, starting at the upper end of the predetermined breaking line 8 and successively merging into the horizontal predetermined breaking line 9. After this tearing open, the airbag cover 6 can be held on the panel 3 by a strip. For this easily controllable opening movement of the airbag cover 6, the arrangement thereof is such that it coincides with a corner section 10 of the panel 3, and also a panel material made from PC-ABS (polycarbonate-acrylbutadiene), are advantageous.

The panel 3 is secured releasably along that contour 11 of the panel which is outside the airbag cover 6 and is determined by the predetermined breaking lines 8 and 9, in a manner which is invisible from the vehicle interior 2, by the panel 3 having latching projections 13 which are molded integrally onto its rear side 12. These latching projections engage in a latching manner into a socket 14 which is provided on a support 15 in the region of the dashboard 1, with the result that the panel 3 is not supported on the visible boundary wall of the dashboard 1, and therefore the panel 3 also does not stress the relatively softly foamed-over boundary wall of the dashboard 1. This support 15 may be a constituent part of a stable wall of the dashboard or another part of the motor-vehicle structure.

The panel 3 is particularly reliably secured by means of latching projections 13 which have a hook shape 16 and are inserted therewith into slotted guide links 17 in the socket 14 and are then displaced approximately in the direction transverse to the panel surface 18 in a manner such that they engage behind the guide links, with the result that it is almost impossible for the latching projections 13 to be inadvertently unlatched. During this displacing movement the panel 3 likewise latches, to the side of the airbag cover 6, with a latching projection 13' into a socket 14' which is fixed on the vehicle and is not supported on the visible boundary wall of the dashboard 1. An involuntarily backwards displacement of the panel 3 is prevented by means of an additional fastening 19 provided in that region which is concealed from sight from the vehicle interior 2. The tabs 20 of the panel 3 are secured to the support 15 by means of screws 21, the coinciding of the tab hole and support hole at the same time also signalling that the panel 3 is latched correctly to the socket 14. These screws 21 are only slightly stressed during the opening movement of the airbag flap 6 and may also be replaced by body-bound rivets.

The possible arrangement and reliable locking in place of the panel 3 in the exit region of the airbag sack 5 make it possible for the exit direction of the airbag sack 5 now to be selected more freely, for example, advantageously approximately parallel with respect to a windshield 22, with the result that impact of the front-passenger airbag sack 5 against a windshield and also an exit direction frontally onto the passenger can be avoided. This arrangement enables the glove compartment to remain below the panel 3.

It is also contemplated to supplement the airbag cover 6 in the panel 3 by a further airbag cover 23 in the visible boundary wall of the dashboard 1, which airbag cover 23 adjoins the airbag cover 6 of the panel 3 and corresponds in its opening movement with the latter. The airbag cover 23 may have preformed predetermined breaking lines as a boundary, but does not have to since the force effect of the inflating airbag sack 5 is sufficient to bring about an opening movement of the airbag cover 23. The inflating direction of the airbag sack 5 may also be influenced by the opening movement of the airbag cover 23 in the visible boundary wall of the instrument panel 1 being controlled, for example, by means of its material properties, such that it is at a later time and has a lesser opening angle than the opening movement of the airbag cover 6 in the panel 3. The rear side 12 of the airbag cover 6 in the panel 3 is provided with tapering projections 24 which support the edge 25 of the airbag cover 23, and which are designed such that they are short and are bent around their longitudinal axis to form a semicircle, with the result that they do not tear off during the opening movement of the airbag covers 6 and 23.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Panel assembly in a motor-vehicle dashboard fascia, comprising:

a panel inserted into a cutout in a visible boundary wall of the fascia, an airbag cover which is delimited with respect to the panel and is configured to be pressed open in the event of a crash by means of an inflating airbag sack, and latching projections releasably securing the panel at least in some regions along a contour of the airbag cover and outside the airbag cover in a manner which is invisible from a vehicle interior, wherein the latching projections which are used for the securing are molded integrally onto a rear side of the panel and engage into associated sockets which are not supported on the visible boundary wall of the fascia.

2. Panel assembly according to claim 1, wherein the airbag cover forms a corner section of the panel and is bounded by predetermined breaking lines which can be torn open successively in the event of a crash by means of the inflating airbag sack.

3. Panel assembly according to claim 1, wherein the latching projections can be inserted with a hook shape into slotted guide links in an associated socket and can then be displaced approximately in a direction transverse to a panel surface facing the vehicle interior in a manner such that they engage behind the panel surface.

4. Panel assembly according to claim 3, wherein the panel is additionally held by means of a releasable fastening in a region which is concealed from sight from the vehicle interior.

5. Panel assembly according to claim 1, wherein the inflating airbag sack is directed approximately in a direction parallel to the windshield.

6. Panel assembly according to claim 2, wherein the inflating airbag sack is directed approximately in a direction parallel to the windshield.

7. Panel assembly according to claim 1, wherein a further airbag cover is provided in the visible boundary wall of the fascia which adjoins the airbag cover of the panel and cooperates therewith as regards its opening movement.

8. Panel assembly according to claim 7, wherein the opening movement of the further airbag cover in the visible boundary wall of the fascia is controlled with a time delay with respect to the opening movement of the airbag cover in the panel.

9. Panel assembly according to claim 7, wherein an edge of the further airbag cover in the visible boundary wall of the fascia is supported on tapering projections on a rear side of the panel.

10. Panel assembly according to claim 1, wherein the panel material is formed by PC-ABS (polycarbonate-acrylbutadiene).

11. A motor vehicle panel assembly which separates an airbag from a vehicle passenger interior space, comprising:

a vehicle interior panel having a cutout opening for an airbag cover panel, an airbag cover panel inserted in said cutout opening, and a releasable cover panel support assembly supporting said airbag cover panel at a vehicle separately from said vehicle interior panel.

12. A motor vehicle panel assembly according to claim 11, wherein said vehicle interior panel is a dashboard panel which in use is disposed in front of a vehicle passenger position in a vehicle.

13. A motor vehicle panel assembly according to claim 11, wherein said releasable cover panel support assembly includes:

latching projections molded to said airbag cover panel at a side thereof facing away from a vehicle interior space when in an in use position on a vehicle, and latching sockets engageable with the latching projections, said latching sockets being supported at said vehicle.

14. A motor vehicle panel assembly according to claim 13, wherein said vehicle interior panel is a dashboard panel which in use is disposed in front of a vehicle passenger position in a vehicle.

\* \* \* \* \*